United States Patent
Wyatt et al.

(10) Patent No.: US 8,542,221 B1
(45) Date of Patent: Sep. 24, 2013

(54) METHOD AND SYSTEM FOR OPTIMIZING DISPLAY POWER REDUCTION THROUGH A CONTINUOUSLY VARIABLE REFRESH RATE ADJUSTMENT

(75) Inventors: David Wyatt, San Jose, CA (US); Laurence Harrison, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1095 days.

(21) Appl. No.: 12/492,020

(22) Filed: Jun. 25, 2009

(51) Int. Cl.
*G06F 3/038* (2013.01)
*G06F 15/00* (2006.01)
*G06T 1/00* (2006.01)

(52) U.S. Cl.
USPC .......................................... 345/204; 345/501

(58) Field of Classification Search
USPC ................................................ 345/501, 204
See application file for complete search history.

(56) References Cited

U.S. PATENT DOCUMENTS

2006/0146056 A1 7/2006 Wyatt
2008/0100598 A1* 5/2008 Juenger ......................... 345/204

* cited by examiner

*Primary Examiner* — Jacinta M Crawford
(74) *Attorney, Agent, or Firm* — Patterson & Sheridan, L.L.P.

(57) ABSTRACT

One embodiment of the present invention sets forth a technique for continuously adjusting a variable refresh rate to reduce the power consumption of a display device. The refresh rate of the display device tracks the effective frame rate of the content being displayed. As the effective frame rate of the content decreases, the refresh rate is lowered until a minimum value is reached. When the effective frame rate of the content equals the refresh rate, the refresh rate is increased until the refresh rate exceeds the effective frame rate of the content or until a maximum value is reached.

19 Claims, 5 Drawing Sheets

METHOD AND SYSTEM FOR OPTIMIZING DISPLAY POWER REDUCTION THROUGH A CONTINUOUSLY VARIABLE REFRESH RATE ADJUSTMENT

BACKGROUND OF THE INVENTION

1. Field of the Invention

Embodiments of the present invention relate generally to reducing the power consumption of display devices, and more specifically, to continuously adjusting a variable refresh rate to control the power consumption of a display device.

2. Description of the Related Art

Unless otherwise indicated herein, the approaches described in this section are not prior art to the claims in this application and are not admitted to be prior art by inclusion in this section.

Liquid crystal display (LCD) panel power is a significant factor in portable device battery life. As much as 40% of total system power can be consumed by the LCD backlight and panel electronics when a portable device is idle. When power consumption of the device is reduced, the battery-life of the device increases, allowing an end-user to operate the device for a longer period of time between recharging.

As the foregoing illustrates, what is needed in the art is a technique for reducing the power consumed by the LCD display to lengthen battery life.

SUMMARY OF THE INVENTION

One embodiment of the present invention sets forth a system and method for continuously adjust a variable refresh rate to reduce the power consumption of a display device. The method includes determining that a first display frame includes a variable frame rate image surface, identifying a usage model of the first display frame indicating that the variable frame rate image surface is the primary surface, computing a refresh rate based on an effective frame rate of the variable frame rate image surface, and outputting image data representing the first display frame at the computed refresh rate to display the first display frame. The effective frame rate of the variable frame rate image surface is the rate at which content of the variable frame rate image surface changes.

One advantage of the disclosed method is that battery-life is extended without compromising the quality of the displayed images.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Throughout this disclosure, the term "display frame" means an image frame that includes one or more image surfaces to be presented on the screen of a display device. Illustrative image surfaces include, without limitation, (i) a base surface, such as a computer desktop background, (ii) an overlay surface, such as a window representing an application program process overlaying the desktop background, and (iii) a cursor surface, such as a blinking carat indicative of a position on the screen. Further, the term "display frame content" refers to graphics data, such as pixel colors or transparency values, for the image represented in a composed display frame.

Figure 1:
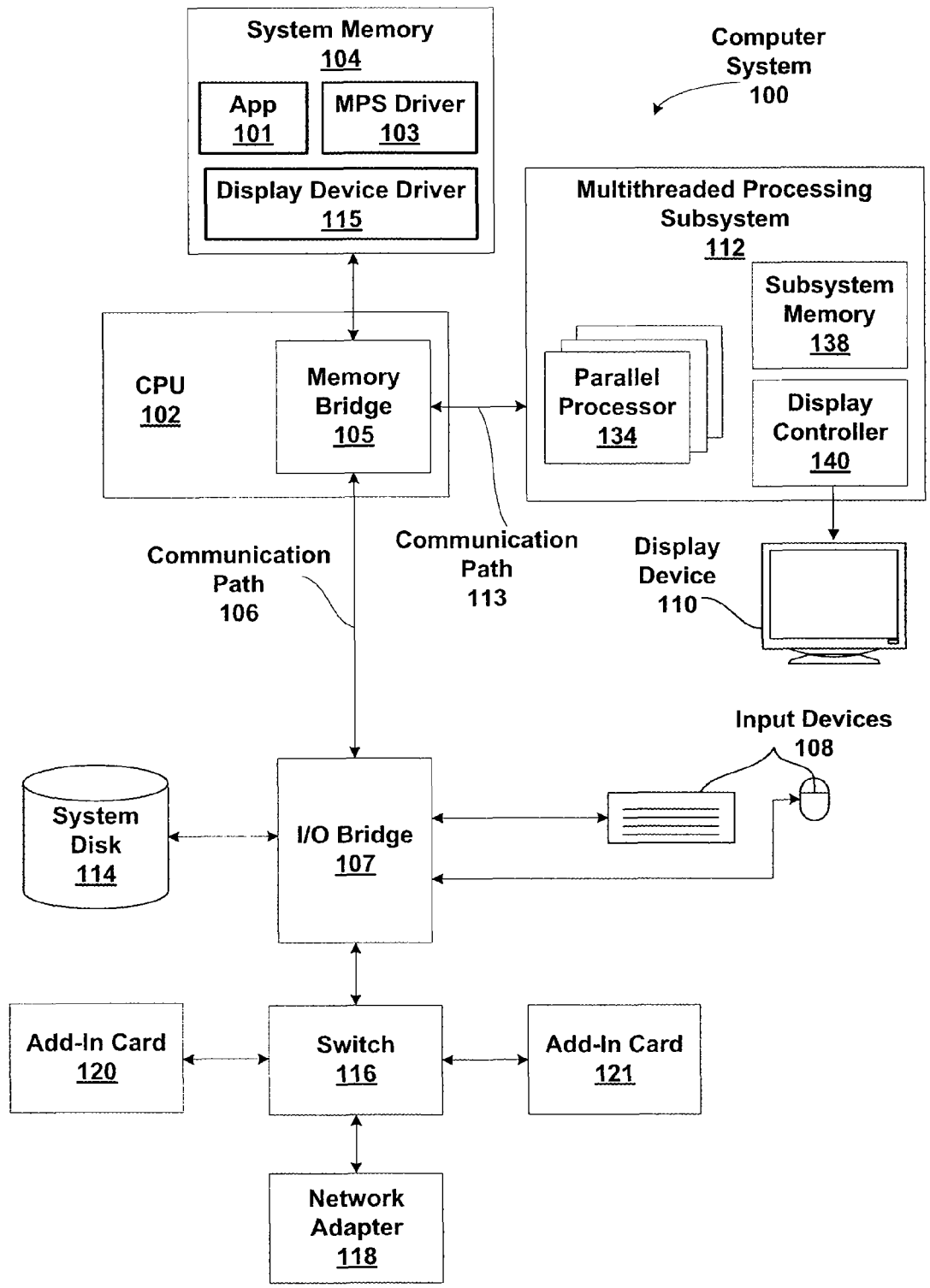
FIG. 1 is a block diagram illustrating a computer system, according to one embodiment of the present invention.

FIG. 1 is a block diagram illustrating a computer system 100 including a CPU 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A multithreaded processing subsystem 112 is coupled to memory bridge 105 via a bus or other communication path 113 (e.g., a PCI Express, Accelerated Graphics Port, or HyperTransport link). In one embodiment, multithreaded processing subsystem 112 is a graphics subsystem that delivers pixels to a display device 110 (e.g., a conventional CRT or LCD based monitor) through a display controller 140. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

CPU 102 operates as the control processor of computer system 100, managing and coordinating the operation of other system components. In particular, CPU 102 issues commands that control the operation of parallel processors 134 within multithreaded processing subsystem 112. In some embodiments, CPU 102 writes a stream of commands for parallel processors 134 to a command buffer (not shown), which may reside in system memory 104, subsystem memory 138, or another storage location accessible to both CPU 102 and parallel processors 134. Parallel processors 134 read the command stream from the command buffer and execute commands asynchronously with respect to the operation of CPU 102.

System memory 104 includes an execution image of an operating system, an MPS (multithreaded processing system) driver 103, a display device driver 115, and one or more application programs 101 that are configured for execution by CPU 102 or multithreaded processing subsystem 112. In the context of the present description, code refers to any computer code, instructions, and/or functions that may be executed using a processor. For example, in various embodiments, the code may include C code, C++ code, etc. In one embodiment, the code may include a language extension of a computer language (e.g., an extension of C, C++, etc.).

The operating system provides the detailed instructions for managing and coordinating the operation of computer system 100. MPS driver 103 provides detailed instructions for managing and coordinating operation of the multithreaded processing subsystem 112, and in particular parallel processors 134. Display device driver 115 is computer code that controls the display of image data on display device 110 through display controller 140. In particular, when the primary content of a display frame is produced at a variable frame rate, display device driver 115 continuously adjusts the display refresh rate based on the effective frame rate at which the primary content of a display frame changes.

The refresh rate is the frequency at which display frames are "repainted" on the display device 110. Display controller 140 outputs frames of image data to display device 110 at a frequency specified by the display refresh rate. Each refresh cycle of the display device 110 usually involves a series of processing steps, including accessing image data of multiple image surfaces rendered and stored in a frame buffer, combining the image surfaces to form a composite display frame, and driving the video signals corresponding to the composite display frame to the display device to update each pixel on the screen of the display device 110. As these processing steps are repeated at a high frequency, more power is consumed by the computer system 100. Consequently, a lower display refresh rate extends the battery-life of computer system 100 while a higher display refresh rate shortens the battery-life of computer system 100.

In one embodiment, the multithreaded processing subsystem 112 incorporates one or more parallel processors 134 which may be implemented, for example, using one or more integrated circuit devices such as programmable processors, application specific integrated circuits (ASICs). Parallel processors 134 may include circuitry optimized for graphics and video processing, including, for example, video output circuitry, and a graphics processing unit (GPU). In another embodiment, the multithreaded processing subsystem 112 may be integrated with one or more other system elements, such as the memory bridge 105, CPU 102, and I/O bridge 107 to form a system on chip (SoC). One or more parallel processors 134 may output data to display device 110 or each parallel processor 134 may output data to one or more display devices 110.

Parallel processors 134 advantageously implements a highly parallel processor that includes one or more processing cores, each of which is capable of executing a large number of threads concurrently where each thread is an instance of a program, such as code 101. Parallel processors 134 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. Parallel processors 134 may transfer data from system memory 104 and/or local subsystem memory 138 into local (on-chip) memory, process the data, and write result data back to system memory 104 and/or subsystem memory 138, where such data can be accessed by other system components, including CPU 102 or another multithreaded processing subsystem 112.

A parallel processor 134 may be provided with any amount of subsystem memory 138, including no subsystem memory 138, and may use subsystem memory 138 and system memory 104 in any combination. For instance, a parallel processor 134 can be a graphics processor in a unified memory architecture (UMA) embodiment. In such embodiments, little or no dedicated subsystem memory 138 would be provided, and parallel processor 134 would use system memory 104 exclusively or almost exclusively. In UMA embodiments, a parallel processor 134 may be integrated into a bridge chip or processor chip or provided as a discrete chip with a high-speed link (e.g., PCI-E) connecting the parallel processor 134 to system memory 104 via a bridge chip or other communication means.

As noted above, any number of parallel processors 134 can be included in a multithreaded processing subsystem 112. For instance, multiple parallel processors 134 can be provided on a single add-in card, or multiple add-in cards can be connected to communication path 113, or one or more parallel processors 134 can be integrated into a bridge chip. Where multiple parallel processors 134 are present, those parallel processors 134 may be operated in parallel to process data at a higher throughput than is possible with a single parallel processor 134. Systems incorporating one or more parallel processors 134 may be implemented in a variety of configurations and form factors, including desktop, laptop, or handheld personal computers, servers, workstations, game consoles, embedded systems, and the like.

In some embodiments of parallel processors 134, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime. Functional units within parallel processors 134 support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.).

The multithreaded processing subsystem 112 includes one or more parallel processors 134, a subsystem memory 138, and a display controller 140. The parallel processor 134 executes instructions received from the CPU 102 to render graphics data into images and stores such images in the subsystem memory 138. CPU 102 and or parallel processors 134 may be configured to generate and store multiple image surfaces in a frame buffer within the subsystem memory 138 and/or system memory 104. The display controller 140 accesses the frame buffer at a specified rate to retrieve and merge the various image surfaces to present on the display device 110 for display. A frame compositor (not shown) within the display controller 140 is responsible for merging the image surfaces to produce an image frame.

Each application program 101 may invoke one or more instances of high-level shader programs that are designed for execution by the rendering engine. These high-level shader programs may be translated into executable program objects by a compiler or assembler included in the MPS driver 103 or alternatively by an offline compiler or assembler operating either on the computer system 100 or other computer systems. The display device driver 115 causes the display controller 140 to access multiple image surfaces from the frame buffer and compose display frames for presentation on the display device 110. In order to control the refresh rate of the display device 110, in one implementation, the display device driver 115 also determines frame content types of image surfaces in the display frames and computes a refresh rate.

Figure 2:
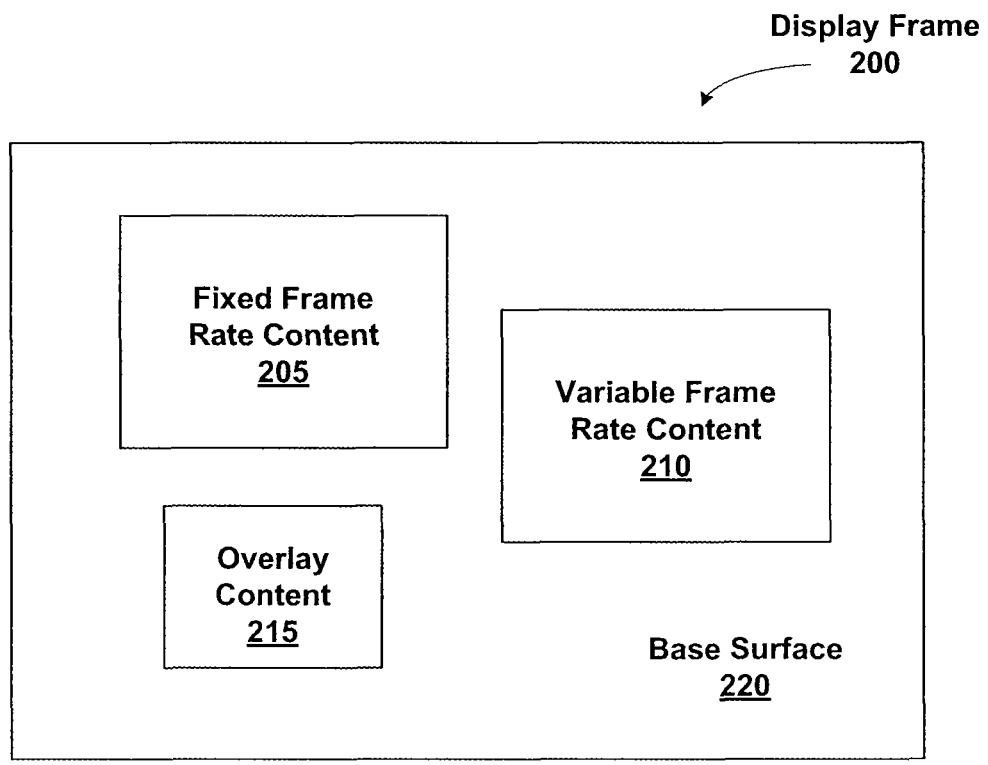
FIG. 2 is a conceptual diagram illustrating a display frame, according to one embodiment of the present invention.

FIG. 2 is a conceptual diagram illustrating a display frame 200, according to one embodiment of the present invention. At each refresh cycle, the frame compositor receives multiple image surface data stored in the frame buffer. In the illustrated embodiment, the multiple image surface data includes a base surface 220, a surface of overlay content 215, a surface of fixed frame rate content 205, and a surface of variable frame rate content 210. The frame compositor is configured to combine the image surfaces into a display frame 200 for presentation on the display device 110.

Possible content types include fixed frame rate content and variable frame rate content. Overlay content 215 and the base surface 220 may include either fixed rate content or variable rate content. In order to compute the refresh rate, the type of content included in the display frame 200 is determined. The content type may be determined using application-OS-driver interfaces. For example, when video is playing in a Windows environment, the DirectX VA (Video Acceleration) driver interface is typically used. When games are playing, the Direct3D or OpenGL interfaces are typically used. Content associated with video is fixed rate content and content associated with games or other 3D graphics applications is variable rate content.

In addition to determining the content type for each image surface within the display frame 200, the usage model for the display frame 200 is also needed in order to compute the refresh rate. The image surfaces within display frame 200 may be displayed in full screen mode or in a window. As shown in FIG. 2, each of the image surfaces that includes fixed frame rate content 205, overlay content 215, and variable frame rate content 210 is displayed in a window. The desktop surface, included as the base surface 220, may be static or active. An active desktop has an effective frame rate that is variable while a static desktop has a fixed frame rate.

When an image surface is displayed in full-screen mode, the image surface fills the display frame 200. When the full-screen mode is used, the display device driver 115 identifies the content type of the image surface that is displayed in the full-screen mode as the primary content type. When the windowed display mode is used, the display device driver 115 identifies one of the image surfaces as the primary image surface, and the primary content type is the content type of the primary image surface. When a single image surface does not dominate compared with the other image surfaces present in the windowed display mode, the content is mixed, i.e., a combination of fixed frame rate and variable frame rate. More specific example display modes include, but are not limited to, full-screen video playback, video playback in a single window on an idle desktop, full-screen game, game in a single window on an idle desktop, active desktop, idle desktop, mixed content, and the like.

The usage model, e.g., full-screen, single window, and mixed, and the primary content type, e.g., fixed frame rate and variable frame rate are used by the display device driver 115 to compute the refresh rate. When the usage model is not mixed and the primary content type is the variable frame rate, the effective frame rate of the primary content is used to compute a continuously adjustable refresh rate. The primary content type and usage model are maintained by the display device driver 115 as state variables. When the mixed usage model is used, the display device driver 115 uses a non-optimized refresh rate, e.g., the maximum refresh rate. Examples of mixed content usage models include a game in one window while video is in another window, multiple game windows, and multiple video windows. When the primary content type is a fixed frame rate an optimized refresh rate is used that matches (or equals twice) the fixed playback frame rate for the video content.

When the primary content is the variable frame rate, the effective frame rate of the primary content is determined. For each newly generated display frame 200, the frame compositor may be configured to determine an effective frame rate at which the content of the image surface frame changes. The effective frame rate is measured by constantly counting the image surface frames with motion over a period of time, e.g., 0.5 seconds. Quantitative changes to pixel values may be detected and accumulated for an image surface frame and a threshold value may be compared with the accumulated quantitative changes to determine whether or not the image surface frame has changed enough to merit incrementing the effective frame rate. The display device driver 115 uses the measured effective frame rate to dynamically adjust the display refresh rate.

Video content is considered to be fixed frame rate content that is typically viewed using a fixed frame rate, e.g., 24 or 48 frames per second, and may be displayed as fixed frame rate content 205. In contrast, the effective frame rate of the variable frame rate content 210 may vary from frame-to-frame depending on the particular content. Three-dimensional (3D) graphics content that is rendered may change at a variable frame rate depending on the complexity and/or viewpoint of the scene being rendered. For example, when the viewpoint in a 3D scene changes, the effective frame rate may increase since each frame of the image surface changes compared with the previous frame of the image surface. When the viewpoint is changing more slowly or is static, the effective frame rate decreases. In order to provide the user with an interactive experience that typifies a high-performance gaming system, the refresh rate for the display device should match the effective frame rate of the primary image surface up to a maximum rate. The maximum rate is typically 59.95 frames per second. A minimum refresh rate for the display device may also be specified.

Figure 3A:
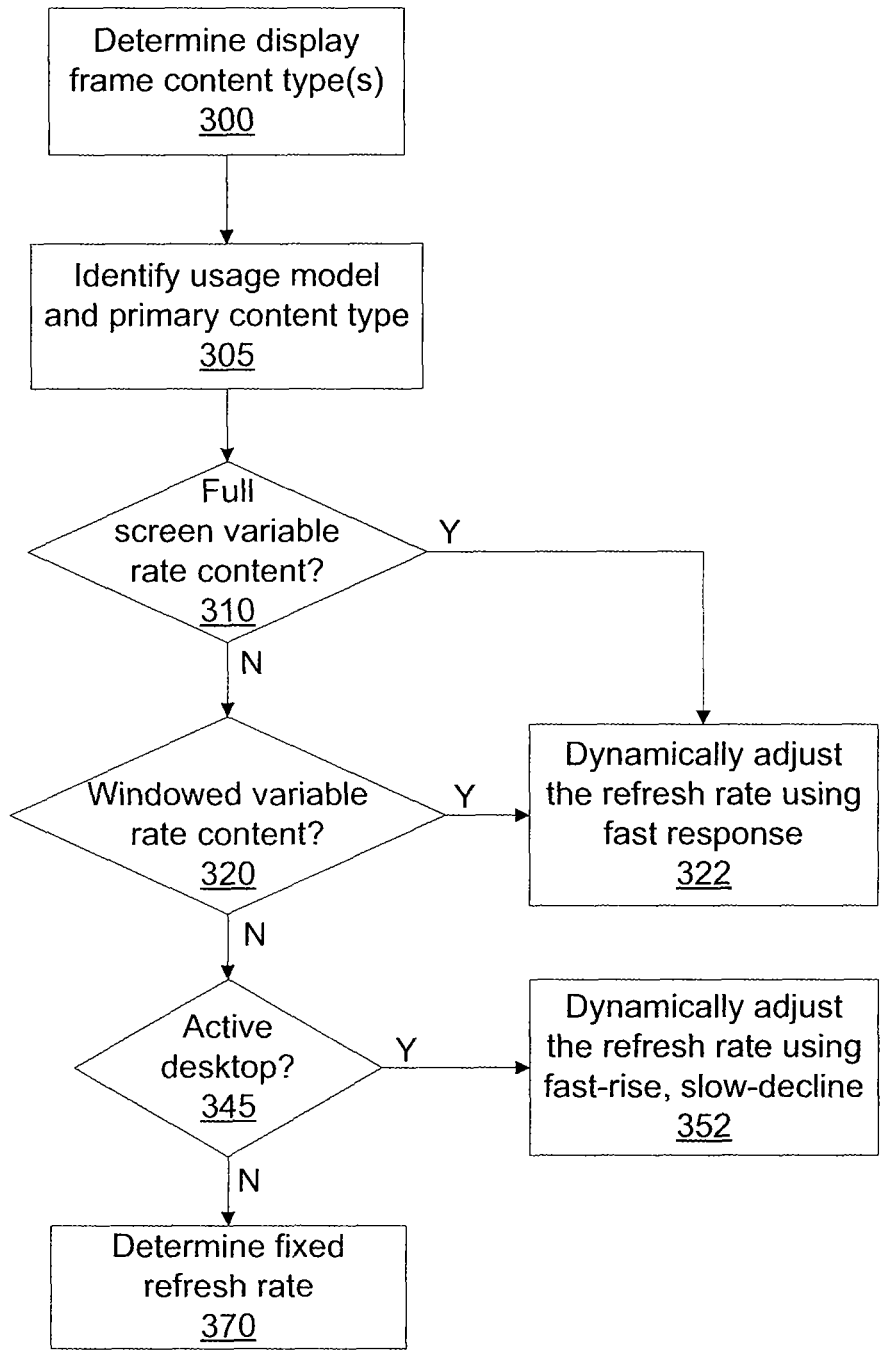
FIG. 3A is a flow diagram of method steps for dynamically adjusting the refresh rate of a display device, according to one embodiment of the present invention.

FIG. 3A is a flow diagram of method steps for continuously adjusting the refresh rate of the display device 110, according to one embodiment of the present invention. Although the method steps are described in conjunction with the system of FIG. 1, persons skilled in the art will understand that any system configured to perform the method steps, in any order, is within the scope of the invention. At step 300 the display device driver 115 determines the content type(s) that are included in the display frame 200. At step 305 the display device driver 115 identifies the usage model, and when the usage model is not mixed, a primary image surface and the corresponding primary content type are identified and stored as state variables.

At step 310 the display device driver 115 determines if the full screen usage model is used to display variable rate content as the primary image surface, and, if so, then the display device driver 115 proceeds directly to step 322. Otherwise, at step 320 the display device driver 115 determines if the windowed usage model is used to display variable rate content in the primary image surface, and, if so, the display device driver 115 proceeds to step 322. At step 322 the display device driver 115 computes the refresh rate using a fast response technique that is described in further detail in conjunction with FIG. 3B. The fast response technique may be used when the primary content type has an effective frame rate that is variable.

If, at step 320 the display device driver 115 determines that the windowed usage model is not used to display variable frame rate content in the primary image surface then the primary content type is fixed frame rate content. In other words, the primary content is either the active or idle desktop or the usage model is mixed. At step 345 the display device driver 115 determines if the primary content type is an active desktop. When the primary content type is an active desktop, the display device driver 115 computes the refresh rate using a fast-rise, slow-decline technique that is described in further detail in conjunction with FIG. 3C.

If, at step 345 the display device driver 115 determines that the primary content type is not the active desktop, then at step 370 the display device driver 115 computes a fixed refresh rate that is used by display controller 140 to output frames to the display device 110. When the content is mixed, the fixed refresh rate may be the maximum refresh rate and when the content is the idle desktop the fixed refresh rate may be the minimum refresh rate. Finally, when the content is fixed frame rate content, such as video, the fixed refresh rate may match the content frame rate or equal a predetermined integer multiple of the content frame rate.

Figure 3B:
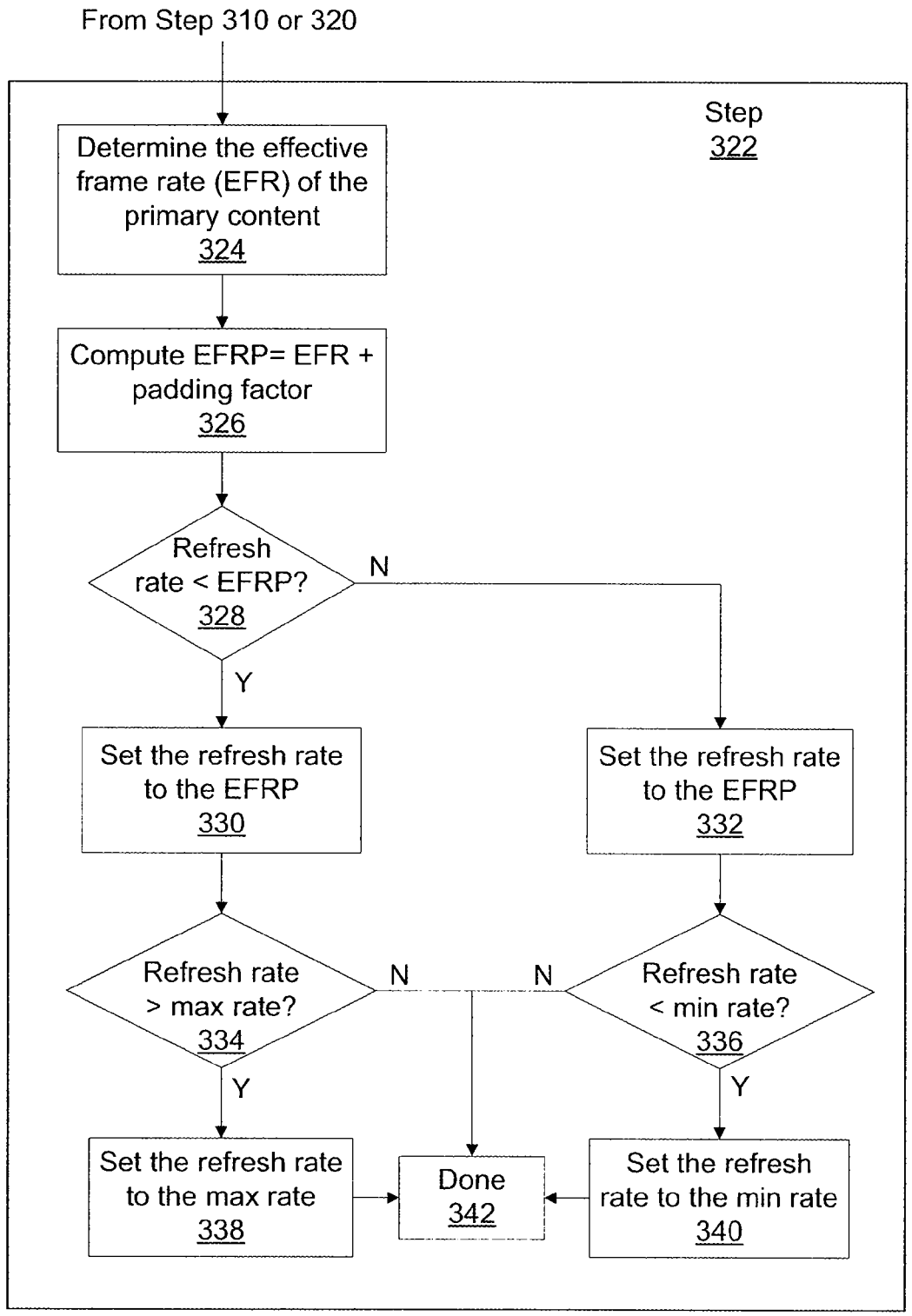
FIG. 3B is a flow diagram of method steps corresponding to a step shown in FIG. 3A, according to one embodiment of the present invention.

FIG. 3B is a flow diagram of method steps corresponding to step 322 shown in FIG. 3A, according to one embodiment of the present invention. The fast response technique for continuously adjusting the refresh rate attempts to adjust the refresh rate to equal the effective frame rate of the primary content summed with a hysteresis padding factor. The hysteresis padding factor may be set to zero in order to exactly match the refresh rate to the effective frame rate. However, since there is a latency inherent in the effective frame rate measurement since the effective frame rate is measured over a time interval, a positive hysteresis padding factor may be specified. When the current refresh rate is within range of the effective frame rate of the primary content, based on the hysteresis padding factor, the computed refresh rate is increased to the lesser of the maximum refresh rate and the effective frame rate summed with the hysteresis padding factor. When the current refresh rate is outside of the range of the effective frame rate of the primary content, based on the hysteresis padding factor (i.e., the current refresh rate is higher than the sum of the effective frame rate of the primary content and the hysteresis padding factor), the computed refresh rate is reduced to the greater of the minimum refresh rate and the sum of the effective frame rate of the primary content and the hysteresis padding factor. This technique provides an interactive experience for the user by continuously adjusting the refresh rate based on the effective frame rate of the primary content while reducing the refresh rate when possible to reduce power consumption.

At step 324 the display controller 140 determines the effective frame rate (EFR) of the primary content. At step 326 the display device driver 115 sums the EFR with a hysteresis padding factor to compute the EFRP. At step 328 the display device driver 115 determines if the current refresh rate is less than the EFRP, i.e., if the effective frame rate is increasing. When the display device driver 115 determines that the refresh rate is less than the EFRP, then at step 330 the display device driver 115 sets the refresh rate to equal the EFRP. At step 334, the display device driver 115 determines if the computed refresh rate (EFRP) is greater than the maximum refresh rate and the hysteresis padding factor, and, if not, at step 342 the refresh rate adjustment is complete. Otherwise, at step 338 the computed refresh rate is clamped to equal the maximum refresh rate. The computed refresh rate is then used by the display controller 140 to display the display frame on the display device 110.

Returning to step 328, when the display device driver 115 determines that the refresh rate is not less than the EFRP (the effective frame rate is decreasing), then at step 332 the display device driver 115 sets the refresh rate to equal the EFRP. At step 336, the display device driver 115 determines if the computed refresh rate (EFRP) is less than the minimum refresh rate, and, if not, at step 342 the refresh rate adjustment is complete. Otherwise, at step 338 the computed refresh rate is clamped to equal the minimum refresh rate. The computed refresh rate is then used by the display controller 140 to display the display frame on the display device 110.

Figure 3C:
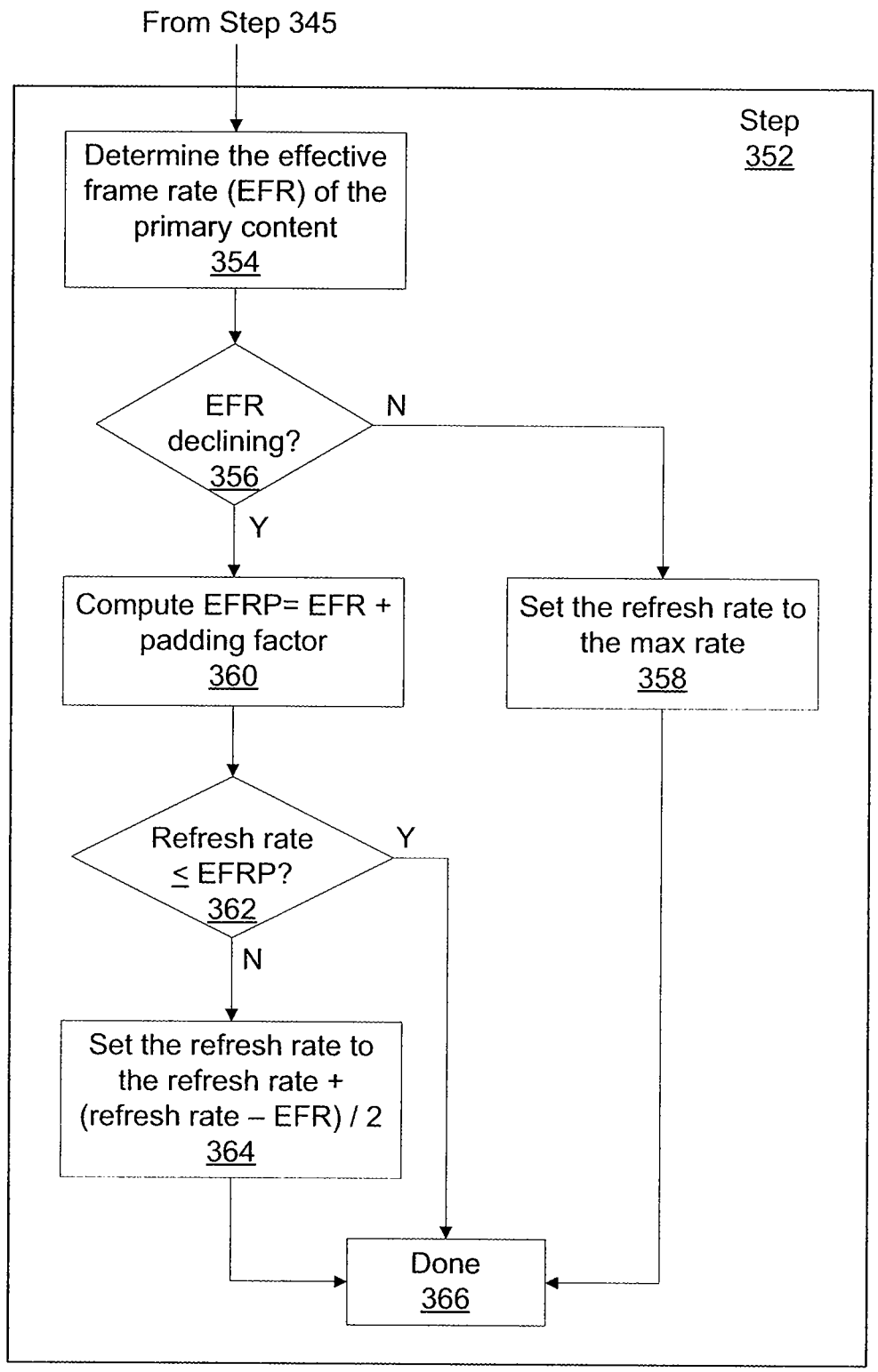
FIG. 3C is a flow diagram of method steps corresponding to another step shown in FIG. 3A, according to one embodiment of the present invention.

FIG. 3C is a flow diagram of method steps corresponding to step 352 in FIG. 3A, according to one embodiment of the present invention. The fast-rise, slow-decline technique for continuously adjusting the refresh rate sets the refresh rate to the maximum refresh rate when the effective frame rate of the primary content (active desktop) is increasing. When the effective frame rate of the primary content is decreasing, the refresh rate is adjusted to be half-way between the current refresh rate and the effective frame rate of the primary content. The minimum computed refresh rate is the effective frame rate summed with the hysteresis padding factor. This technique provides high performance when the effective frame rate increases and gradually reduces the power consumption when the effective frame rate is decreasing.

At step 354 the display controller 140 determines the effective frame rate (EFR) of the primary content (the active desktop). At step 356 the display device driver 115 determines if the EFR is declining, and, if not at step 358 the display device driver 115 sets the computed refresh rate to equal the maximum refresh rate and proceeds directly to step 366. The computed refresh rate is then used by the display controller 140 to display the display frame on the display device 110.

If, at step 356 the display device driver 115 determines that the EFR is declining, then at step 360 the display device driver 115 sums the EFR with the hysteresis padding factor to compute the EFRP. At step 362, the display device driver 115 determines if the current refresh rate is less than or equal to (not greater than) the EFRP, and, if so, then the display device driver proceeds directly to step 366 without modifying the refresh rate, so the computed refresh rate equals the current refresh rate.

If, at step 362, the display device driver 115 determines that the current refresh rate is not less than or equal to (is greater than) the EFRP, then at step 364 the computed refresh rate is set to the current refresh rate+((the current refresh rate−EFRP)/2). In other words, the computed refresh rate is halfway between the current refresh rate and the effective frame rate. The display device driver 115 then proceeds to step 366 and the computed refresh rate is used by the display controller 140 to display the display frame on the display device 110.

A policy may be defined that specifies the technique used by the display device driver 115 to compute the refresh rate, e.g., fixed, fast response, fast-rise, slow-decline, maximum rate, minimum, and the like. Therefore, the refresh rate computation technique may be customized by the system manufacturer. The user may specify an operating mode ranging between high-performance interaction and low-power consumption. This operating mode may also be used to determine the technique used by the display device driver 115 to compute the refresh rate.

The display controller 140 may adjust the refresh rate by changing the pixel clock. However, changing the pixel clock typically requires that output to the display be suspended while a phase locked loop is reconfigured when a single clock source is used or while a different clock is selected when multiple clock sources are used. Rather than changing the pixel clock to continuously adjust the refresh rate, the refresh rate may be adjusted by increasing or decreasing the duration of the horizontal or vertical blanking time between each display frame. The reading of frame data for output to the display device 110 may continue while the horizontal or vertical blanking duration is modified to change the refresh rate.

One embodiment of the present invention sets forth a technique for continuously adjusting a variable refresh rate to reduce the power consumption of a display device. The refresh rate of the display device tracks the effective frame rate of the content being displayed by dynamically adjusting the refresh rate of the display device. As the effective frame rate of the content decreases, the refresh rate is lowered until a minimum value is reached. When the effective frame rate of the content is within range of the refresh rate based on a padding factor, the refresh rate is increased or set to the effective frame rate. The refresh rate is clamped to a maximum value. This technique is particularly advantageous for displaying variable frame rate content. Conventional power saving techniques that reduce the refresh rate when an idle state is detected and increase the refresh rate to a high fixed refresh rate when activity is detected or to a fixed refresh rate for film or video playback. These conventional power saving techniques do not continuously adjust the refresh rate based on an effective frame rate of variable frame rate content.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A computer-implemented method for continuously adjusting a refresh rate used to display frames of image data, the method comprising:
   identifying a first display frame that includes an image surface;
   identifying a usage model of the first display frame indicating that the-image surface is a primary surface;
   determining whether content associated with the image surface is fixed frame rate content or variable frame rate content;
   if the content associated with the image surface is fixed frame rate content, then:
      computing a computed refresh rate based on an integer multiple of a frame rate of the fixed frame rate content, or
   if the content associated with the image surface is variable frame rate content, then:
      computing a computed refresh rate based on an effective frame rate of the variable frame rate content; and
   sending image data representing the first display frame at the computed refresh rate to a display device to display the first display frame.

2. The method of claim 1, wherein the content associated with the image surface is variable frame rate content, and the computed refresh rate equals the effective frame rate of the variable frame rate content.

3. The method of claim 1, wherein the content associated with the image surface is variable frame rate content, and the computed refresh rate is within a range of the effective frame rate of the variable frame rate using a hysteresis padding factor.

4. The method of claim 1, further comprising clamping the computed refresh rate to a maximum refresh rate when the computed refresh rate is greater than the maximum refresh rate and a hysteresis padding factor.

5. The method of claim 1, further comprising clamping the computed refresh rate to a minimum refresh rate when the computed refresh rate is less than the minimum refresh rate.

6. The method of claim 1, wherein the usage model of the first display frame comprises a full-screen display mode.

7. The method of claim 1, wherein the usage model of the first display frame comprises a windowed display mode.

8. The method of claim 1, wherein the usage model of the first display frame comprises an active desktop, the content associated with the image surface is variable frame rate content, and the computed refresh rate equals a maximum refresh rate when the effective frame rate of the variable frame rate image surface is increasing and the computed refresh rate is halfway between a current refresh rate and the effective frame rate of the variable frame rate image surface.

9. The method of claim 1, further comprising repeating the steps of identifying a first display frame, identifying a usage model, determining, computing, and sending to compute additional computed refresh rates and display additional frames of the image data using the additional computed refresh rates.

10. A non-transitory computer-readable medium that includes instructions that, when executed by a general purpose processor, configure the general purpose processor to continuously adjust a refresh rate used to display frames of image data, by performing the steps of:
   identifying a first display frame that includes an image surface;
   identifying a usage model of the first display frame indicating that the image surface is a primary surface;

determining whether content associated with the image surface is fixed frame rate content or variable frame rate content;

if the content associated with the image surface is fixed frame rate content, then:
  computing a computed refresh rate based on an integer multiple of a frame rate of the fixed frame rate content, or if the content associated with the image surface is variable frame rate content, then:
  computing a computed refresh rate based on an effective frame rate of the variable frame rate content; and sending image data representing the first display frame at the computed refresh rate to a display device to display the first display frame.

11. A computing device for continuously adjusting a refresh rate used to display frames of image data, the computing device comprising:

a memory system for storing frames of image data including a first display frame;

a processing unit configured to execute a display device driver that performs a set of operations comprising:
  identifying that the first display frame includes an image surface;
  identifying a usage model of the first display frame indicating that the image surface is a primary surface;
  determining whether content associated with the image surface is fixed frame rate content or variable frame rate content; and
  if the content associated with the image surface is fixed frame rate content, then:
    computing a computed refresh rate based on an integer multiple of a frame rate of the fixed frame rate content, or
  if the content associated with the image surface is variable frame rate content, then:
    computing a computed refresh rate based on an effective frame rate of the variable frame rate content; and a display controller configured to send image data representing the first display frame at the computed refresh rate to display the first display frame on a display device.

12. The computing device of claim 11, wherein the content associated with the image surface is variable frame rate content, and the computed refresh rate equals the effective frame rate of the variable frame rate content.

13. The computing device of claim 11, wherein the content associated with the image surface is variable frame rate content, and the computed refresh rate is within a range of the effective frame rate of the variable frame rate using a hysteresis padding factor.

14. The computing device of claim 11, further comprising clamping the computed refresh rate to a maximum refresh rate when the computed refresh rate is greater than the maximum refresh rate and a hysteresis padding factor.

15. The computing device of claim 11, further comprising clamping the computed refresh rate to a minimum refresh rate when the computed refresh rate is less than the minimum refresh rate.

16. The computing device of claim 11, wherein the usage model of the first display frame comprises a full-screen display mode.

17. The computing device of claim 11, wherein the usage model of the first display frame comprises a windowed display mode.

18. The computing device of claim 11, wherein the usage model of the first display frame comprises an active desktop, the content associated with the image surface is variable frame rate content, and the computed refresh rate equals a maximum refresh rate when the effective frame rate of the variable frame rate image surface is increasing and the computed refresh rate is halfway between a current refresh rate and the effective frame rate of the variable frame rate image surface.

19. The computing device of claim 11, wherein the processing unit is further configured to repeat the operations of identifying a first display frame, identifying a usage model, determining, computing, and sending to compute additional computed refresh rates and the display controller is further configured to display additional frames of the image data using the additional computed refresh rates.

* * * * *

UNITED STATES PATENT AND TRADEMARK OFFICE
CERTIFICATE OF CORRECTION

PATENT NO.        : 8,542,221 B1                                    Page 1 of 1
APPLICATION NO.   : 12/492020
DATED             : September 24, 2013
INVENTOR(S)       : Wyatt et al.

It is certified that error appears in the above-identified patent and that said Letters Patent is hereby corrected as shown below:

In the Claims:

Column 10, Claim 1, Line 8, please delete "the-image" and insert -- the image -- therefor;

Column 10, Claim 3, Line 32, please insert -- content -- before using;

Column 12, Claim 13, Line 8, please insert -- content -- before using.

Signed and Sealed this
Thirty-first Day of December, 2013

Margaret A. Focarino
*Commissioner for Patents of the United States Patent and Trademark Office*